United States Patent [19]

Davis

[11] Patent Number: 5,312,008
[45] Date of Patent: May 17, 1994

[54] PERSONAL TIME CAPSULE

[76] Inventor: Bradford L. Davis, P.O. Box 58, Warrensburg, Ill. 62573

[21] Appl. No.: 72,841

[22] Filed: May 26, 1993

[51] Int. Cl.⁵ .............................................. B65D 6/02
[52] U.S. Cl. .................................. 220/4.21; 220/4.24; 277/70
[58] Field of Search ......... 220/4.21, 4.24, 233, 220/239; 277/70, 71, 75, 29

[56] References Cited

U.S. PATENT DOCUMENTS

| | | | |
|---|---|---|---|
| 4,042,143 | 8/1977 | Higgins | 220/256 |
| 4,254,793 | 3/1981 | Scaramucci | 277/29 X |
| 4,457,517 | 7/1984 | Dunegan | 277/70 X |
| 4,500,009 | 2/1985 | Ruzmus et al. | 220/256 |
| 4,665,668 | 5/1989 | Serpico | 52/169.2 |
| 4,813,566 | 3/1989 | Hewitt | 220/4.24 |
| 5,060,817 | 10/1991 | Trussler | 220/414 |

Primary Examiner—Steven M. Pollard
Attorney, Agent, or Firm—Hugh E. Smith

[57] ABSTRACT

A time capsule for personal use comprising a hollow two-part cylinder of high strength, non-corrosive, non-biodegradable plastic; means to interlock said two parts of said cylinder in hermetically sealed relationship, said means including a resilient, compressible gasket member. Preferably said gasket member is hollow, having one end thereof terminating within said cylinder to allow evacuation of substantially all the air therefrom.

2 Claims, 3 Drawing Sheets

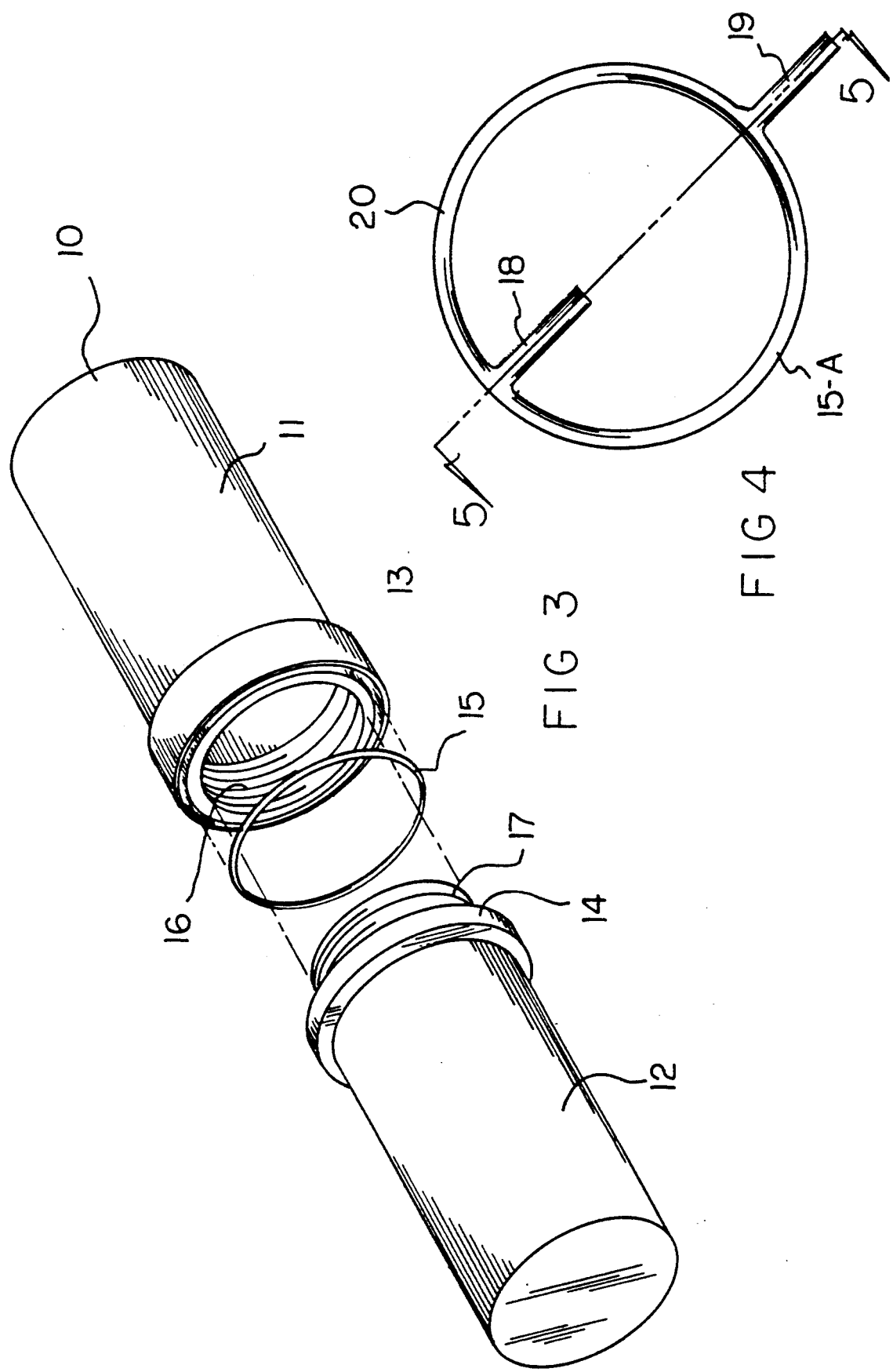

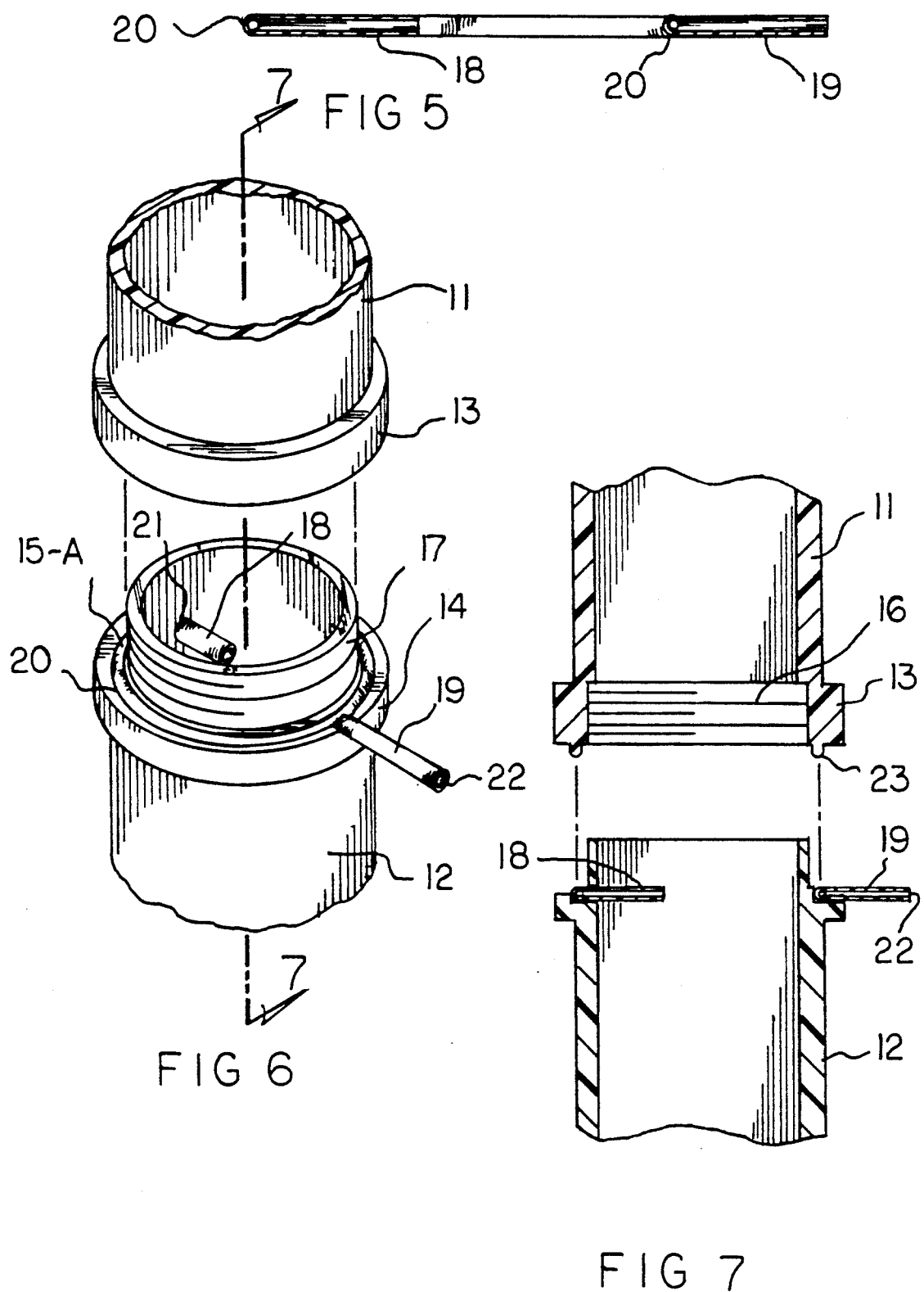

PERSONAL TIME CAPSULE

BACKGROUND OF THE INVENTION

1. Field of the Invention

The present invention relates to sealed containers and more particularly pertains to such containers which may be utilized as a personal time capsule, keeping the contents of such container intact for long periods of time.

2. Description of the Prior Art

The use of air-tight sealed containers is known in the prior art. More specifically, such containers heretofore devised and utilized for the purpose of time capsules and have consisted basically of familiar, expected and obvious structural configurations, notwithstanding the myriad of designs encompassed by the crowded prior art which have been developed for the fulfillment of countless objectives and requirements. U.S. Pat. No. 4,665,668 illustrates such a time capsule while additional air-tight closures are shown in U.S. Pat. Nos. 4,500,009; 4,042,143; and 5,060,817.

In several respects, the time capsule according to the present invention substantially departs from the conventional concepts and designs of the prior art, and in so doing provides an apparatus primarily developed for the purpose of keeping documents, tapes or the like in a preserved state for extremely long periods of time.

SUMMARY OF THE INVENTION

In view of the foregoing disadvantages inherent in the known types of time capsules now present in the prior art, the present invention provides an improved time capsule construction wherein the same can be utilized as a personal means for preserving items for long periods of time. As such, the general purpose of the present invention, which will be described subsequently in greater detail, is to provide a new and improved time capsule which has all the advantages of the prior art devices and none of the disadvantages.

To attain this, the present invention essentially relates to a time capsule for personal use comprising a hollow two-part cylinder of high strength, non-corrosive, non-biodegradable plastic; means to interlock said two parts of said cylinder in hermetically sealed relationship, said means including a resilient, compressible gasket member. Preferably said gasket member is hollow, having one end thereof terminating within said cylinder to allow evacuation of substantially all the air therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved time capsule which has all the advantages of the prior art devices and none of the disadvantages.

It is another object of the present invention to provide a new and improved time capsule which may be easily and efficiently manufactured and marketed.

It is a further object of the present invention to provide a new and improved time capsule which is of a durable and reliable construction.

An even further object of the present invention is to provide a new and improved time capsule which is susceptible of a low cost of manufacture with regard to both materials and labor, and which accordingly is then susceptible of low prices of sale to the consuming public, thereby making such devices economically available to the buying public.

Still another object of the present invention is to provide a new and improved personal time capsule.

Yet another object of the present invention is to provide a new and improved time capsule designed for individual purchase and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded perspective view of the device of FIGS. 1 and 2.

FIG. 4 is a top plan view of a modified preferred type of gasket for use in the device of FIGS. 1-3.

FIG. 5 is a sectional view of such gasket on line 5—5 of FIG. 4.

FIG. 6 is an exploded perspective view of the time capsule of this invention showing the gasket of FIGS. 4 and 5 in place.

FIG. 7 is a sectional plan view of the device of FIG. 6, taken on line 7—7 of FIG. 6.

DESCRIPTION OF THE PREFERRED EMBODIMENT

Figure 1:
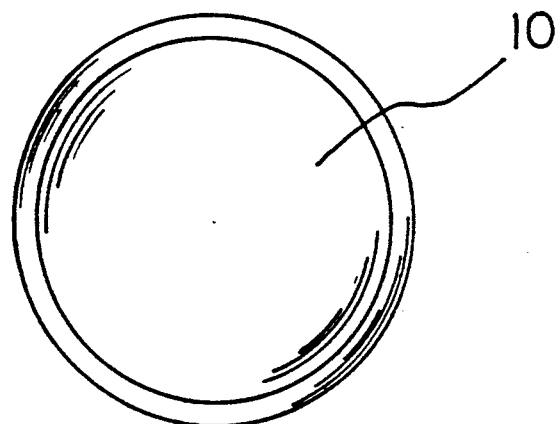
FIG. 1 is a top plan view of the time capsule device of this invention.
Figure 2:
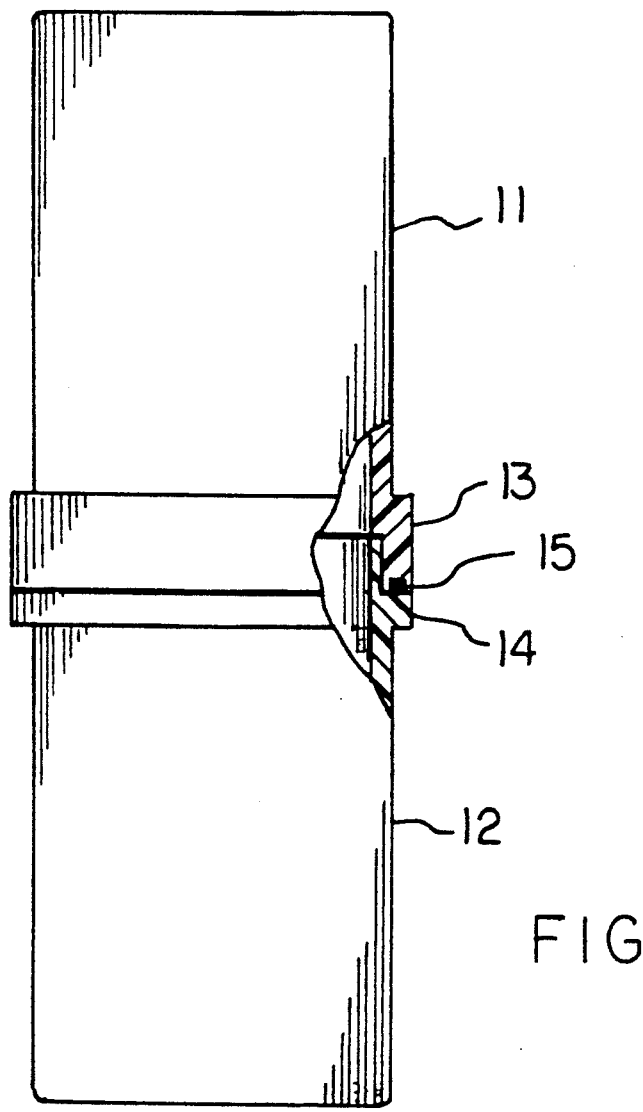
FIG. 2 is a side plan view partially in section of the device of FIG. 1.

With reference now to the drawings, and in particular to FIGS. 1 and 2 thereof, a new and improved personal time capsule embodying the principles and concepts of the present invention and generally designated by the reference numeral 10 will be described.

More specifically, it will be noted that the time capsule 10 is composed of two cylindrical sections 11 and 12 which are capable of being secured together as shown in FIG. 2. Each of cylinders 11 and 12 has a larger diameter reinforcing ring 13 and 14 respectively forming the mating surface thereof. As shown in FIG. 2 and in more detail below, a gasket member 15 is interposed between such rings 13 and 14.

Referring now to FIG. 3, it illustrates that one of the cylinders 11 has internal female threads 16 at that portion thereof surrounded by reinforcing collar 13, while cylinder 12 has a male threaded portion 17 upwardly extending from and internal of collar 14, said threaded portion 17 being adapted to engage with and thread into the female threads 16 of cylinder 11. Gasket 15 fits around the periphery of portion 17 of cylinder 12 and is compressed between rings 13 and 14 when the cylinder sections 11 and 12 when the unit 10 is threaded together.

FIG. 4 illustrates a preferred form of gasket 15-A which is formed of a resilient material such as nylon, rubber or the like in a hollow tubular construction. It will be noted here and in the subsequent drawings that rather than being merely a circular gasket, gasket 15-A has a pair of projecting hollow tubular extensions 18 and 19 extending therefrom. As shown in FIG. 5, these hollow tubular projections 18 and 19 are in open relationship to the main circular portion 20 of gasket 15-A.

FIG. 6 shows gasket 15-A in position on cylinder section 12. It will be noted that in this preferred form, one of the projecting tubular extensions 18 of gasket 15-A is allowed to extend into the interior of such cylinder 12 by means of a port 21 extending through the wall of cylinder 12 immediately below the male threaded portion 17 thereof. The main circular portion 20 of gasket 15-A nests, as before with gasket 15, in the space between threaded portion 17 and the internal wall of reinforcing ring 14. The remaining hollow tubular projection 19 extends outwardly from the rest of the circular portion 20 of gasket 15 to a point beyond the plane of the external surfaces of the capsule 10. In use, the outer end 22 of hollow tubular extension 19 is engaged with the intake end of a vacuum pulling means (not shown). This may comprise a range from sophisticated devices capable of high vacuum down to hand pumps or even mouth suction depending upon the degree of vacuum desired. Before activating whatever vacuum system is to be used, the sections 11 and 12 of the capsule 10 are screwed together tightly enough to constitute a substantially air-tight seal but not enough to collapse gasket 15-A. Suction is then applied to end 22 of extension 19 and the air is exhausted via hollow extension tube 18 from the interior of capsule 10. If the vacuum is sufficiently high, gasket 15-A will completely collapse. In any case, before suction is released the sections 11 and 12 are screwed together as tightly as possible with a small projecting ring 23 on cylindrical reinforcing collar 13 engaging with and holding in its collapsed state or collapsing it if needed, gasket 15-A to produce a hermetical seal between the two sections 11 and 12 of capsule 10. Suction is then discontinued and the unit 10 disconnected from whatever suction means was employed. If desired, the projecting hollow tube extension can then be cut off flush with the exterior of collar 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new personal time capsule which comprises:
    a hollow, two sectioned cylinder of high strength, non-corrosive, non-biodegradable plastic;
    a gasket member adapted to be positioned between the two sections of said time capsule, said gasket member comprising a hollow tube extending around a periphery of one of said two sections and having a portion thereof communicating with an interior of said capsule and further having a second portion thereof external of said capsule and adapted to engage with a means for producing a vacuum within said capsule and within said hollow tube; and,
    means to join said two sections together.

2. The capsule as in claim 1, wherein said means to join said two sections together comprises mating threaded means on said two sections, one of said sections having a projecting ring thereon for engaging with and compressing said hollow tube gasket member.

* * * * *